United States Patent
Chen et al.

(10) Patent No.: US 9,065,690 B2
(45) Date of Patent: Jun. 23, 2015

(54) METHOD AND APPARATUS FOR PERFORMING CHANNEL SHORTENING EQUALIZATION WITH FREQUENCY NOTCH MITIGATION

(75) Inventors: Yen-Liang Chen, Taipei (TW);
Shao-Wei Feng, Taipei (TW);
Cheng-Zhou Zhan, New Taipei (TW);
An-Yeu Wu, Taipei (TW)

(73) Assignees: MEDIATEK INC., Science-Based Industrial Park, Hsin-Chu (TW);
National Taiwan University, Taipei (TW)

( * ) Notice: Subject to any disclaimer, the term of this patent is extended or adjusted under 35 U.S.C. 154(b) by 0 days.

(21) Appl. No.: 13/461,764

(22) Filed: May 1, 2012

(65) Prior Publication Data
US 2013/0114664 A1    May 9, 2013

Related U.S. Application Data

(60) Provisional application No. 61/481,262, filed on May 2, 2011.

(51) Int. Cl.
| | |
|---|---|
| *H03H 7/30* | (2006.01) |
| *H03H 7/40* | (2006.01) |
| *H04L 27/01* | (2006.01) |
| *H04L 25/02* | (2006.01) |
| *H04L 25/03* | (2006.01) |
| *H04L 27/26* | (2006.01) |

(52) U.S. Cl.
CPC ............ *H04L 27/01* (2013.01); *H04L 25/0242* (2013.01); *H04L 25/03044* (2013.01); *H04L 27/2647* (2013.01)

(58) Field of Classification Search
CPC ............ H04B 3/23; G06F 1/022; H03H 17/06
USPC ................................... 375/232, 260, 340, 350
See application file for complete search history.

(56) References Cited

U.S. PATENT DOCUMENTS

| | | | | |
|---|---|---|---|---|
| 5,822,324 | A  * | 10/1998 | Kostresti et al. | 370/487 |
| 2003/0112861 | A1 * | 6/2003 | Erdogan et al. | 375/232 |
| 2003/0142762 | A1 * | 7/2003 | Burke | 375/340 |
| 2003/0210742 | A1 * | 11/2003 | Balakrishnan et al. | 375/232 |
| 2003/0235312 | A1 * | 12/2003 | Pessoa et al. | 381/66 |
| 2004/0001450 | A1 * | 1/2004 | He et al. | 370/286 |
| 2004/0165674 | A1 * | 8/2004 | Huang | 375/260 |
| 2007/0297499 | A1 * | 12/2007 | de Victoria | 375/232 |
| 2008/0240311 | A1 * | 10/2008 | Piirainen et al. | 375/344 |

\* cited by examiner

*Primary Examiner* — Sam K Ahn
*Assistant Examiner* — Fabricio R Murillo Garcia
(74) *Attorney, Agent, or Firm* — Winston Hsu; Scott Margo

(57) ABSTRACT

A method for performing channel shortening equalization with frequency notch mitigation is provided, where the method is applied to an electronic device. The method includes: obtaining channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and based upon the relaxed channel convolution matrix, jointly performing time domain channel shortening control and frequency domain flatness control over the TEQ to perform channel shortening equalization with frequency notch mitigation by utilizing the TEQ. In particular, the portion of matrix elements includes a plurality of rows of matrix elements within the channel convolution matrix. An associated apparatus is also provided.

33 Claims, 5 Drawing Sheets

TIR = $\mathbf{H}_R \mathbf{w}$ $\underbrace{\begin{pmatrix} 0 & \cdots & 0 \end{pmatrix}}_{\text{Delay}} \; 1 \; 0 \; \cdots \; 0$

FIG. 4

METHOD AND APPARATUS FOR PERFORMING CHANNEL SHORTENING EQUALIZATION WITH FREQUENCY NOTCH MITIGATION

CROSS REFERENCE TO RELATED APPLICATIONS

This application claims the benefit of U.S. Provisional Application No. 61/481,262, which was filed on May 2, 2011 and is entitled "Channel Shortening Equalizer with Effective Frequency Notch Mitigation for OFDM Systems", and is included herein by reference.

BACKGROUND

The present invention relates to time domain equalization control of an electronic device, and more particularly, to a method for performing channel shortening equalization with frequency notch mitigation, and to an associated apparatus.

According to the related art, in orthogonal frequency division multiplexing (OFDM) systems, a conventional time domain equalizer (TEQ) can be used to reduce the so-called intersymbol interference (ISI) by shortening the channel impulse response when the channel length is larger than a cyclic prefix (CP) length. However, some problems may occur. For example, when implementing the conventional OFDM architecture with any of most conventional channel shortening methods, one or more deep frequency notches in the effective channel impulse response (CIR) in the frequency domain are typically introduced, causing significant system performance degradation. As a result, the conventional OFDM architecture may keep using some sub-channels of very low signal to noise ratios (SNRs), and the bit error rate (BER) of the conventional OFDM architecture may decrease significantly. In another example, a conventional channel shortening method is proposed to search for a weighting coefficient controlling the tradeoff between the channel shortening performance and the target impulse response (TIR) quality, causing exhaustive search of the weighting coefficient. As a result of implementing the additional hardware resources (e.g. plenty of calculation units and the associated storage units) for supporting the exhaustive search of the weighting coefficient, a large chip area is required, and therefore, the additional costs are eventually shifted on to the end user. In conclusion, the related art does not serve the end user well. Thus, a novel method is required for enhancing time domain equalization control of an electronic device.

SUMMARY

It is therefore an objective of the claimed invention to provide a method for performing channel shortening equalization with frequency notch mitigation, and to provide an associated apparatus, in order to solve the above-mentioned problems.

It is another objective of the claimed invention to provide a method for performing channel shortening equalization with frequency notch mitigation, and to provide an associated apparatus, in order to eliminate Intersymbol Interference (ISI) without introducing any deep frequency notch in orthogonal frequency division multiplexing (OFDM) systems.

It is another objective of the claimed invention to provide a method for performing channel shortening equalization with frequency notch mitigation, and to provide an associated apparatus, in order to prevent any exhaustive search of a weighting coefficient controlling the tradeoff between the channel shortening performance and the target impulse response (TIR) quality in OFDM systems.

An exemplary embodiment of a method for performing channel shortening equalization with frequency notch mitigation is provided, where the method is applied to an electronic device, and the electronic device comprises a time domain equalizer (TEQ). The method comprises the steps of: obtaining channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and based upon the relaxed channel convolution matrix, jointly performing time domain channel shortening control and frequency domain flatness control over the TEQ to perform channel shortening equalization with frequency notch mitigation by utilizing the TEQ.

An exemplary embodiment of an apparatus for performing channel shortening equalization with frequency notch mitigation is provided, where the apparatus comprises at least one portion of an electronic device, and the electronic device comprises a TEQ. The apparatus comprises a control module and a calculation circuit. The control module is arranged to obtain channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix. In addition, the calculation circuit is arranged to perform calculations according to the relaxed channel convolution matrix, wherein based upon the relaxed channel convolution matrix, the calculation circuit jointly performs time domain channel shortening control and frequency domain flatness control over the TEQ to perform channel shortening equalization with frequency notch mitigation by utilizing the TEQ. In particular, the apparatus comprises the TEQ.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates a one-channel calculation scheme involved with the method shown in FIG. 2 according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In the following description, some boldfaced capital letters are used for indicating matrices, and some boldfaced lowercase letters are used for indicating vectors. In addition, notations $(\bullet)^H$ and $(\bullet)^T$ denote the complex conjugate transpose and the transpose of a vector or matrix, respectively. Additionally, the notation $\|\bullet\|$ denotes the two-norm of a vector, and the notation * denotes the convolution operation.

Figure 1:
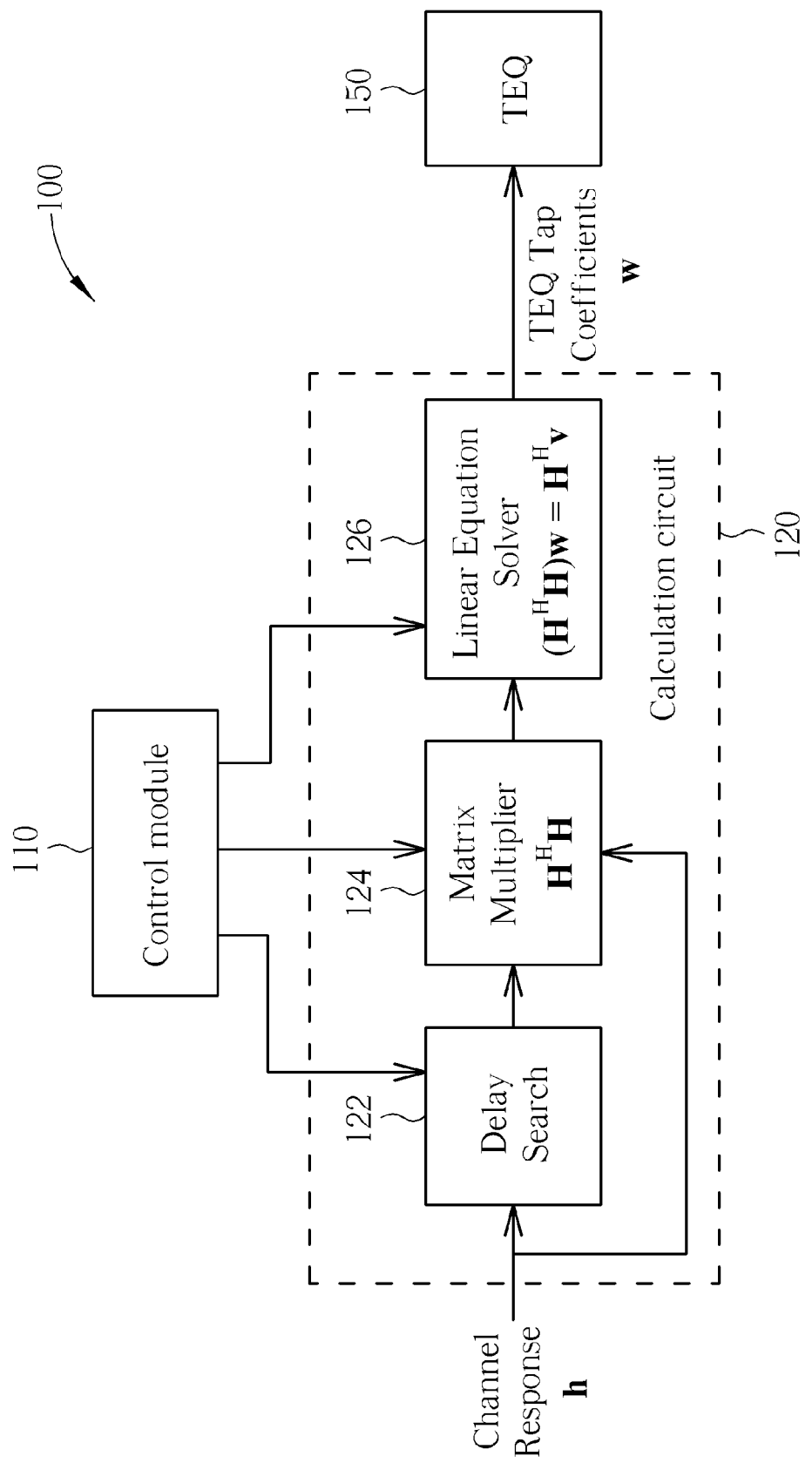
FIG. 1 is a diagram of an apparatus for performing channel shortening equalization with frequency notch mitigation according to a first embodiment of the present invention.

Please refer to FIG. 1, which illustrates a diagram of an apparatus 100 for performing channel shortening equalization with frequency notch mitigation according to a first embodiment of the present invention. According to different embodiments, such as the first embodiment and some variations thereof, the apparatus 100 may comprise at least one portion (e.g. a portion or all) of an electronic device such as a portable electronic device, where the electronic device can be an orthogonal frequency division multiplexing (OFDM) system such as a single input single output (SISO) OFDM system or a multiple-input multiple-output (MIMO) OFDM system. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

As shown in FIG. 1, the apparatus 100 comprises a control module 110 and a calculation circuit 120, where the calculation circuit 120 comprises a delay search module 122 (labeled "Delay Search"), a matrix multiplier 124 (labeled "Matrix Multiplier $H^HH$" in this embodiment, where the notation "$H^HH$" stands for the product of the complex conjugate transpose of a matrix H under consideration and the matrix H), and a linear equation solver 126 (labeled "Linear Equation Solver $(H^HH)w=H^HV$" in this embodiment, where the notation "$(H^HH)w=H^Hv$" stands for an equation under consideration, regarding the matrix H and vectors w and v under consideration). More particularly, the apparatus 100 of the first embodiment may further comprise a time domain equalizer (TEQ) 150. For example, the apparatus 100 (more particularly, the control module 110, calculation circuit 120, and the TEQ 150) can be integrated into the same IC. This is for illustrative purposes only, and is not meant to be a limitation of the present invention. According to some variations of this embodiment, the electronic device may comprise the TEQ 150, where the TEQ 150 can be implemented outside the apparatus 100. For example, in one of these variations, the apparatus 100 can be implemented with a first IC, and the TEQ 150 can be integrated into a second IC that differs from the first IC, where the first IC and the second IC can be implemented within the same package, and can be electrically connected with each other by utilizing some bonding techniques. No matter whether the TEQ 150 is implemented within the apparatus 100 or is implemented outside the apparatus 100, the apparatus 100 comprises a plurality of hardware circuits, and is typically implemented with an IC, in order to achieve the best performance. For example, any of the control module 110, the delay search module 122, the matrix multiplier 124, and the linear equation solver 126 may comprise some hardware circuits, such as multiplexers, registers, adders, and/or multipliers.

Figure 2:
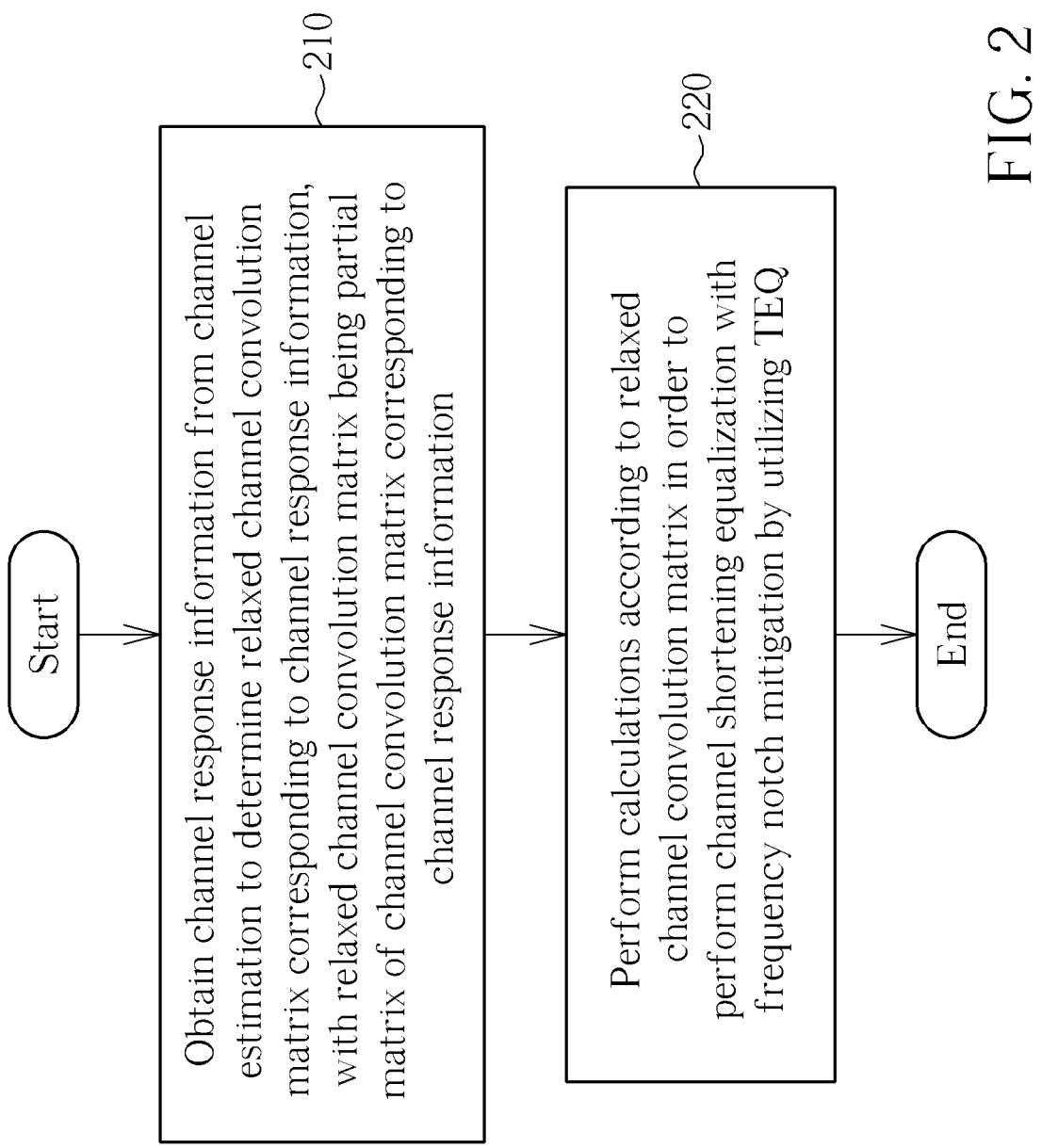
FIG. 2 illustrates a flowchart of a method for performing channel shortening equalization with frequency notch mitigation according to an embodiment of the present invention.

FIG. 2 illustrates a flowchart of a method 200 for performing channel shortening equalization with frequency notch mitigation according to an embodiment of the present invention. The method shown in FIG. 2 can be applied to the apparatus 100 shown in FIG. 1. The method is described as follows.

In Step 210, the control module 110 obtains channel response information such as a channel impulse response (CIR) vector h representing the CIR (for example, h=[h(0), h(1), . . . , h($N_h$−1)]$^T$, for $N_h$-tap CIR) from channel estimation to determine a relaxed channel convolution matrix $H_{relaxed}$ corresponding to the channel response information, with the relaxed channel convolution matrix $H_{relaxed}$ being a partial matrix of the channel convolution matrix H corresponding to the channel response information, where the relaxed channel convolution matrix $H_{relaxed}$ is obtained from omitting a portion of matrix elements of the channel convolution matrix H.

In Step 220, the calculation circuit 120 performs calculations according to the relaxed channel convolution matrix $H_{relaxed}$ in order to perform channel shortening equalization with frequency notch mitigation by utilizing the TEQ 150. More particularly, based upon the relaxed channel convolution matrix $H_{relaxed}$, the calculation circuit 120 jointly performs time domain channel shortening control and frequency domain flatness control over the TEQ 150 to perform channel shortening equalization with frequency notch mitigation by utilizing the TEQ 150.

According to this embodiment, the portion of matrix elements of the channel convolution matrix H may comprise a plurality of rows of matrix elements within the channel convolution matrix H. For example, given that the parameter d represents the delay parameter that is utilized for controlling the window position of channel shortening, the plurality of rows of matrix elements may start from the (d+2)$^{th}$ row within the channel convolution matrix H. In another example, given that the parameter d represents the delay parameter that is utilized for controlling the window position of channel shortening and the parameter v represents the length of the cyclic prefix (CP) in the OFDM system, the plurality of rows of matrix elements may end at the (d+v+1)$^{th}$ row within the channel convolution matrix H. In another example, the plurality of rows of matrix elements may start from the (d+2)$^{th}$ row within the channel convolution matrix H, and may end at the (d+v+1)$^{th}$ row within the channel convolution matrix H, where the number of the plurality of rows of matrix elements is equal to v.

In this embodiment, the calculation circuit 120 is arranged to perform calculations according to the relaxed channel convolution matrix $H_{relaxed}$. The delay search module 122 is arranged to perform a delay search operation to determine the delay parameter d mentioned above, in order to control performance of channel shortening. In addition, the matrix multiplier 124 is arranged to calculate the product ($H_{relaxed}^H$ $H_{relaxed}$) of the complex conjugate transpose $H_{relaxed}^H$ of the relaxed channel convolution matrix $H_{relaxed}$ and the relaxed channel convolution matrix $H_{relaxed}$. With the aid of the product ($H_{relaxed}^H$ $H_{relaxed}$) obtained from the matrix multiplier 124, the linear equation solver 126 can easily solve an equation corresponding to the relaxed channel convolution matrix $H_{relaxed}$, in order to obtain equalization information, where the equalization information is utilized for controlling the TEQ 150 to convert the CIR represented by the channel response information (e.g. the CIR vector h) into a target impulse response (TIR). For example, the equalization information can be an equalization vector whose elements are the TEQ tap coefficients of the TEQ 150, where the equalization vector can be taken as an example of the aforementioned vector w under consideration. In a situation where the TEQ 150 is a $N_w$-tap TEQ and w=[w(0), w(1), . . . , w($N_w$−1)]$^T$, the calculation circuit 120 sends the equalization vector w generated by the linear equation solver 126 into the TEQ 150, and therefore, the TEQ 150 utilizes the equalization vector was the TEQ tap coefficients thereof.

Please note that, by properly omitting the portion of matrix elements of the channel convolution matrix H, the control module 110 can perform frequency domain flatness control over the TEQ 150 through the calculation circuit 120 since, based upon the relaxed channel convolution matrix $H_{relaxed}$ determined by the control module 110, the calculation circuit 120 jointly performs time domain channel shortening control and frequency domain flatness control over the TEQ 150. As a result of utilizing the relaxed channel convolution matrix $H_{relaxed}$ determined by the control module 110, the apparatus 100 can perform channel shortening equalization with frequency notch mitigation, having no need to perform any exhaustive search of a weighting coefficient controlling the tradeoff between the channel shortening performance and the TIR quality. Therefore, the present invention method and apparatus (e.g. the apparatus 100 and the method 200) are suitable for IC implementation of portable electronic devices since the chip area can be greatly reduced in comparison with some conventional channel shortening method(s).

According to a variation of this embodiment, the apparatus 100 (more particularly, the control module 110) can performing frequency domain flatness control over the TEQ 150 by adaptively adjusting the size/location (e.g. the size and/or the location) of the portion of matrix elements of the channel convolution matrix to be omitted, in order to control the degree of frequency notch mitigation by utilizing the TEQ 150 through the calculation circuit 120. Similar descriptions are not repeated in detail for this variation.

Figure 3:
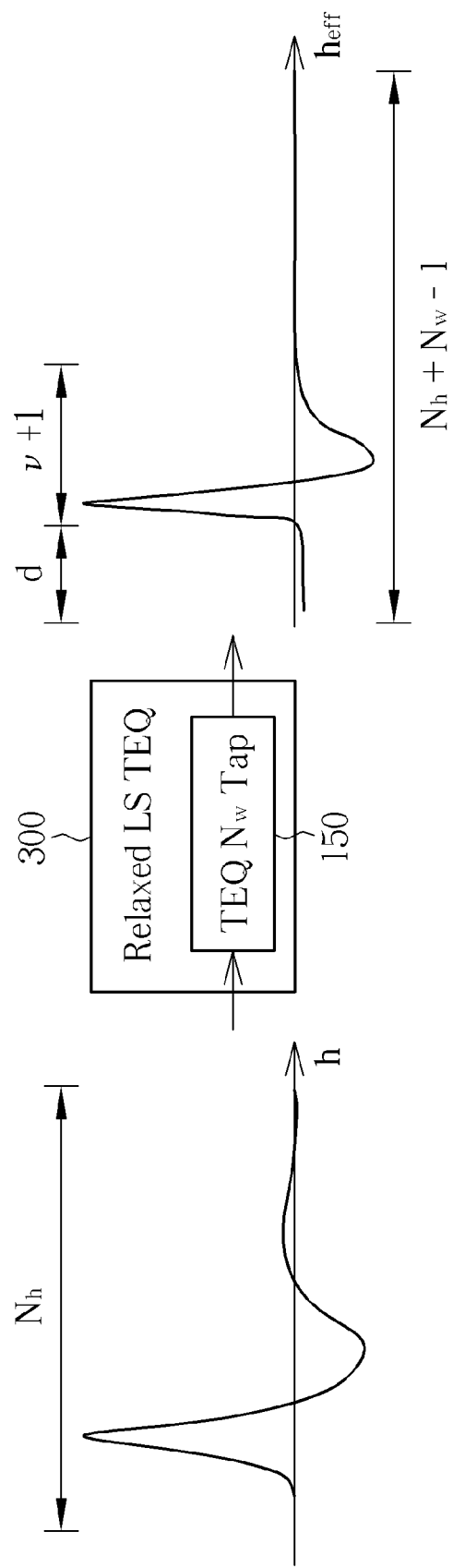
FIG. 3 illustrates a channel shortening scheme involved with the method shown in FIG. 2 according to an embodiment of the present invention.

FIG. 3 illustrates a channel shortening scheme involved with the method 200 shown in FIG. 2 according to an embodiment of the present invention. In addition to the aforementioned TEQ 150 (labeled "TEQ $N_w$ Tap" in FIG. 3), the relaxed least-squares TEQ 300 (labeled "Relaxed LS TEQ" in FIG. 3) of this embodiment further comprises the control module 110 and the calculation circuit 120 shown in FIG. 1, where the linear equation solver 126 of this embodiment can solve the equation corresponding to the relaxed channel convolution matrix $H_{relaxed}$ to obtain a least-squares solution corresponding to the equation, and utilize the least-squares solution as the equalization information.

According to this embodiment, the calculation circuit 120 (more particularly, the linear equation solver 126) can minimize the value of a cost function associated to the aforementioned equation corresponding to the relaxed channel convolution matrix $H_{relaxed}$ to obtain the least-squares solution mentioned above. For example, the cost function may comprise at least one term associated to the aforementioned equation corresponding to the relaxed channel convolution matrix $H_{relaxed}$, and more particularly, can be a two-norm of the aforementioned at least one term. As a result, the calculation circuit 120 (more particularly, the linear equation solver 126) can solve the equation to obtain a plurality of elements of the equalization vector w (e.g. w=[w(0), w(1), . . . , w($N_w$−1)]$^T$), and utilize the plurality of elements of the Equalization vector was the TEQ tap coefficients of the TEQ 150 to control the TEQ 150.

Please note that the convolution of h and w can be regarded as the effective CIR vector $h_{eff}$, which can be expressed as follows:

$$h_{eff} = h*w = [h_{eff}(0), h_{eff}(1), \ldots, h_{eff}(N_h-1)]^T \quad (1);$$

where the effective CIR vector $h_{eff}$ representing the effective CIR. As shown in FIG. 3, the length of CIR (i.e. the length $N_h$, referring to the upper left corner of FIG. 3) is shorten to be the length $N_L$ (i.e. the length ($N_h$+$N_w$−1), referring to the lower right corner of FIG. 3), where $N_L$=$N_h$+$N_w$−1. In matrix representation, the above equation of the effective CIR vector $h_{eff}$ can be written as follows:

$$h_{eff} = Hw \quad (2);$$

where the matrix H is typically given by:

$$H = \begin{bmatrix} h(0) & 0 & \ldots & & 0 \\ h(1) & h(0) & & & \vdots \\ \vdots & \vdots & \ddots & & 0 \\ h(N_h-1) & h(N_h-2) & \ldots & h(N_h-N_w+1) & h(N_h-N_w) \\ 0 & h(N_h-1) & \ldots & & h(N_h-N_w+1) \\ \vdots & & \ddots & & \vdots \\ 0 & \ldots & & 0 & h(N_h-1) \end{bmatrix} \quad (3)$$

In a situation where the plurality of rows of matrix elements (i.e. the aforementioned portion of matrix elements of the channel convolution matrix H in this embodiment) starts from the (d+2)$^{th}$ row within the channel convolution matrix H and ends at the (d+v+1)$^{th}$ row within the channel convolution matrix H, the relaxed channel convolution matrix $H_{relaxed}$ can be expressed as follows:

$$H_{relaxed} = \begin{bmatrix} h(0) & 0 & \ldots & 0 \\ \vdots & \ddots & \ddots & \vdots \\ h(d) & h(d-1) & \ldots & h(d-N_w-1) \\ h(d+v+1) & h(d+v) & \ldots & h(d+v-N_w+2) \\ \vdots & \ddots & \ddots & \vdots \\ 0 & \ldots & 0 & h(N_h-1) \end{bmatrix}_{(N_L-v) \times N_w} \quad (4)$$

where the relaxed channel convolution matrix $H_{relaxed}$ is a ($N_L$−v) by $N_w$ matrix.

Regarding omitting the (d+2)$^{th}$ row through to the (d+v+1)$^{th}$ row within the channel convolution matrix H to obtain the relaxed channel convolution matrix $H_{relaxed}$, the theory thereof and some implementation details are further described as follows.

In order to completely prevent the frequency notch problem of the conventional OFDM architecture, the design of the relaxed least-squares TEQ 300 should make the effective CIR be close to a delta response. Thus, the TEQ tap coefficients of the TEQ 150 can be derived by minimizing the value of $\|Hw - v_{ideal}\|^2$, where the notation $v_{ideal}$ can be regarded as the ideal TIR in time domain, and can be expressed as follows:

$$v_{ideal} = \begin{bmatrix} \underbrace{0, 0, \ldots, 0,}_{d\ zeros} & \underbrace{1, 0, \ldots, 0,}_{v+1} & \underbrace{0, 0, \ldots 0}_{(N_L-d-v-2)\ zeros} \end{bmatrix}^T. \quad (5)$$

One way of solving the minimization of $\|Hw - v_{ideal}\|^2$ is applying the least-squares method to $\|Hw - v_{ideal}\|^2$, and therefore, the TEQ tap coefficients can be expressed as:

$$w_{LS} = (H^H H)^{-1} H^H v_{ideal} \quad (6);$$

where the suffix "LS" of the notation $w_{Ls}$ stands for "least-squares". Please note that it is impossible to design a finite-tap TEQ to perfectly shorten the CIR into a delta response. Therefore, the least-squares solution will lead to a worse shortening signal to noise ratio (SSNR) value of the effective CIR. Although the frequency response of the effective CIR is flatter, the system performance is still degraded since the SSNR value is too low.

To jointly consider the time domain channel shortening control and the frequency domain flatness control, it is suggested, according to the method 200, to relax the assumption of the ideal TIR and define a new TIR (more particularly, a new TIR vector) as follows:

$$v_r = \begin{bmatrix} \underbrace{0, 0, \ldots, 0,}_{d\ zeros} & \underbrace{1, \Delta, \ldots, \Delta}_{v+1} & \underbrace{0, 0, \ldots 0}_{(N_L-d-v-2)\ zeros} \end{bmatrix}^T; \quad (7)$$

where the notation $\Delta$ means the unconcerned value(s). Then, an exemplary cost function such as the two-norm $\|Hw - v_r\|^2$ of the term $(Hw - v_r)$ can be utilized for calculating optimal w as follows:

$$w_{opt} = \underset{w}{\operatorname{argmin}} \|Hw - v_r\|^2; \quad (8)$$

where the notation $w_{opt}$ stands for optimal w. Since some entries in the TIR vector $v_r$ are uninterested, Equation (8) can be rewritten as follows:

$$w_{opt} = \underset{w}{\operatorname{argmin}} \|H_{relaxed} w - v_{relaxed}\|^2; \quad (9)$$

where $H_{relaxed}$ is the remaining matrix after removing the aforementioned portion of matrix elements of the channel convolution matrix H (i.e. the portion comprising the $(d+2)^{th}$ row through to the $(d+v+1)^{th}$ row within the channel convolution matrix H) and can be written as shown in Equation (4) disclosed above, and the relaxed TIR vector $v_{relaxed}$ is the remaining vector after removing the unconcerned values in the TIR vector $v_r$, i.e., $$v_{relaxed} = \begin{bmatrix} \underbrace{0, 0, \ldots, 0, 1,}_{d\ zeros} & \underbrace{0, 0, \ldots 0}_{(N_L-d-v-2)\ zeros} \end{bmatrix}^T. \quad (10)$$

The optimal w in Equation (9), i.e., $w_{opt}$, can be expressed as follows:

$$w_{opt} = (H_{relaxed}^H H_{relaxed})^{-1} H_{relaxed}^H v_{relaxed} \quad (11).$$

FIG. 4 illustrates a one-channel calculation scheme involved with the method 200 shown in FIG. 2 according to an embodiment of the present invention, where the one-channel calculation scheme is suitable for SISO OFDM systems. The matrix $H_R$ (whose different sets of rows are shaded as shown in FIG. 4, with nothing labeled therein for brevity) can be taken as an example of the relaxed channel convolution matrix $H_{relaxed}$ mentioned above, and can be utilized for performing matrix calculation operations on the equalization vector w (whose elements are non-shaded as shown in FIG. 4, with nothing labeled therein for brevity). In addition, the relaxed TIR vector (labeled "TIR" in FIG. 4) starts with d zeros (i.e. the delay shown in FIG. 4), and then continues with an element of one (i.e. the only "1" in the relaxed TIR vector shown in FIG. 4, for representing the impulse of the delta response mentioned above), and then continues with $(N_L - d - v - 2)$ zeros, as disclosed in Equation (10). Additionally, the same degree of shading in both of a portion of the relaxed TIR vector and a corresponding portion of the matrix $H_R$ shown in FIG. 4 can be utilized for representing the calculation relationship between the some element(s) in the relaxed TIR vector and the associated elements in the matrix $H_R$. For example, the first element in the relaxed TIR vector comes from the product of the first row in the matrix $H_R$ and all of the elements in the equalization vector w. In another example, the $i^{th}$ element in the relaxed TIR vector comes from the product of the $i^{th}$ row in the matrix $H_R$ and all of the elements in the equalization vector w.

Please note that, based upon the above descriptions regarding Equation (7) through to Equation (11), the one-channel calculation scheme of the embodiment shown in FIG. 4 can be extended to multi-channel calculation schemes according to some variations of this embodiment. For example, the one-channel calculation scheme of the embodiment shown in FIG. 4 can be extended to a four-channel calculation scheme according to one of these variations, and some associated equations can be expressed as follows:

$$\begin{bmatrix} H_{relaxed,1} \\ H_{relaxed,2} \\ H_{relaxed,3} \\ H_{relaxed,4} \end{bmatrix} w = \begin{bmatrix} v_{relaxed,1} \\ v_{relaxed,2} \\ v_{relaxed,3} \\ v_{relaxed,4} \end{bmatrix}; \text{ and} \quad (12)$$

$$H_{relaxed} w = v_{relaxed}; \quad (13)$$

where the notations $H_{relaxed,1}$, $H_{relaxed,2}$, $H_{relaxed,3}$, and $H_{relaxed,4}$ represent sub-matrixes of the relaxed channel convolution matrix $H_{relaxed}$ of this variation, with the sub-matrixes $H_{relaxed,1}$, $H_{relaxed,2}$, $H_{relaxed,3}$, and $H_{relaxed,4}$ respectively corresponding to the four channels $CH_1$, $CH_2$, $CH_3$, and $CH_4$ under consideration, and the notations $v_{relaxed,1}$, $v_{relaxed,2}$, $v_{relaxed,3}$, and $v_{relaxed,4}$ represent the corresponding portions of elements within the relaxed TIR vector $v_{relaxed}$ of this variation, with the portions $v_{relaxed,1}$, $v_{relaxed,2}$, $v_{relaxed,3}$, and $v_{relaxed,4}$ respectively corresponding to the four channels $CH_1$, $CH_2$, $CH_3$, and $CH_4$ under consideration.

According to this variation, the joint vector of w for all channels such as the four channels $CH_1$, $CH_2$, $CH_3$, and $CH_4$ under consideration, i.e., $w_{joint}$, can be written as the optimal w expressed Equation (11). In addition, the overall response (i.e. the effective CIR vector $h_{eff}$ of this variation) can be expressed as follows:

$$h_{eff} = h_{R1} + h_{R2} h_{R3} h_{R4} \quad (14);$$

where $h_{R1} = H_{relaxed,1} w_{joint}$, $h_{R2} = H_{relaxed,2} w_{joint}$, $h_{R3} = H_{relaxed,3} w_{joint}$, and $h_{R4} = H_{relaxed,4} w_{joint}$.

Figure 5:
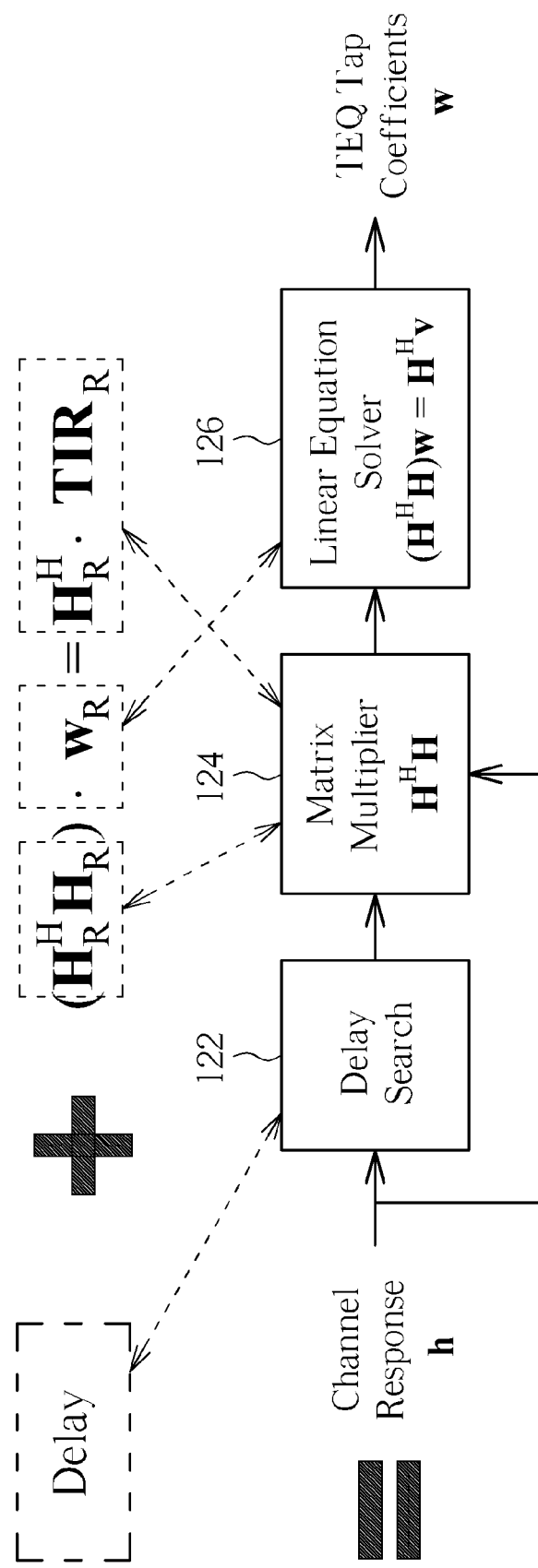
FIG. 5 illustrates a calculation scheme involved with the method shown in FIG. 2 according to another embodiment of the present invention.

FIG. 5 illustrates a calculation scheme involved with the method 200 shown in FIG. 2 according to another embodiment of the present invention. This calculation scheme is based upon the following equation:

$$w_R = (H_R^H H_R)^{-1} H_R^H \cdot TIR_R \quad (15);$$

where the matrix $H_R$ can be taken as an example of the relaxed channel convolution matrix $H_{relaxed}$ mentioned above, and the equalization vector $w_R$ can be taken as an example of the aforementioned equalization vector w. For example, the notation $TIR_R$ in the above equation may represent the relaxed TIR vector $v_{relaxed}$ in Equation (11).

As shown in FIG. 5, the calculation operations of the calculation scheme may comprise the delay search operation (labeled "Delay") performed by the delay search module 122, the product calculation operations regarding the aforementioned product ($H_{relaxed}^H H_{relaxed}$) such as the product ($H_R^H H_R$) (illustrated with "($H_R^H H_R$)", for example) and associated calculation operations (illustrated with "$H_R^H TIR_R$", for example) performed by the matrix multiplier 124, and the equation solving operation (illustrated with "$w_R$", for example) performed by the linear equation solver 126. Similar descriptions are not repeated in detail for this embodiment.

According to some embodiments, such as the embodiment shown in FIG. 3 and some variations thereof, the linear equation solver 126 can minimize the value of the aforementioned cost function associated to the equation corresponding to the relaxed channel convolution matrix $H_{relaxed}$ to obtain the least-squares solution, where any of Equation (11) and Equation (15) can be taken as an example of the aforementioned equation corresponding to the relaxed channel convolution matrix $H_{relaxed}$. For example, the cost function may comprise at least one term ($H_{relaxed} w - v_{relaxed}$) associated to Equation (11), and more particularly, can be the two-norm $\|H_{relaxed} w - v_{relaxed}\|^2$ of the term ($H_{relaxed} w - v_{relaxed}$). In another example, the cost function may comprise at least one term ($H_R w_R - TIR_R$) associated to Equation (15), and more particularly, can be the two-norm $\|H_R w_R - TIR_R\|^2$ of the term ($H_R w_R - TIR_R$).

It is an advantage of the present invention that the present invention method and apparatus can eliminate Intersymbol Interference (ISI) without introducing any deep frequency notch. Some simulation results indicate that, in comparison with the conventional channel shortening methods, the present invention method and apparatus can guarantee the best system performance in OFDM systems.

In addition, in comparison with the related art, the present invention method and apparatus can prevent any exhaustive search of a weighting coefficient controlling the tradeoff between the channel shortening performance and the TIR quality, and therefore, are suitable for IC implementation of portable electronic devices since the chip area can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing channel shortening equalization with frequency notch mitigation, the method being applied to an electronic device, the electronic device comprising a time domain equalizer (TEQ), the method comprising the steps of:

obtaining, by a controller, channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and based upon the relaxed channel convolution matrix, jointly performing time domain channel shortening control and frequency domain flatness control over the TEQ to perform channel shortening equalization with frequency notch mitigation by utilizing the TEQ, wherein the step of jointly performing time domain channel shortening control and frequency domain flatness control over the TEQ to perform channel shortening equalization with frequency notch mitigation by utilizing the TEQ further comprises:

calculating, by a matrix multiplier comprised in a calculation circuit, a product of a complex conjugate transpose of the relaxed channel convolution matrix and the relaxed channel convolution matrix;

wherein the portion of matrix elements of the channel convolution matrix comprises at least one row of matrix elements within the channel convolution matrix;

at least one relative row location of the at least one row of matrix elements within the channel convolution matrix corresponds to a delay parameter that is utilized for controlling a window position of channel shortening;

the portion of matrix elements of the channel convolution matrix comprises a plurality of rows of matrix elements within the channel convolution matrix; and the plurality of rows of matrix elements starts at a $(d+2)^{th}$ row within the channel convolution matrix, wherein the parameter d represents the delay parameter that is utilized for controlling the window position of channel shortening.

2. The method of claim 1, wherein the plurality of rows of matrix elements ends at a $(d+v+1)^{th}$ row within the channel convolution matrix, wherein the parameter v represents a length of a cyclic prefix (CP).

3. The method of claim 1, wherein a number of the plurality of rows of matrix elements is equal to v.

4. The method of claim 1, wherein the step of jointly performing time domain channel shortening control and frequency domain flatness control over the TEQ to perform channel shortening equalization with frequency notch mitigation by utilizing the TEQ further comprises:

performing a delay search operation to determine the delay parameter, in order to control performance of channel shortening.

5. The method of claim 1, wherein the step of jointly performing time domain channel shortening control and frequency domain flatness control over the TEQ to perform channel shortening equalization with frequency notch mitigation by utilizing the TEQ further comprises:

solving an equation corresponding to the relaxed channel convolution matrix, in order to obtain equalization information, wherein the equalization information is utilized for controlling the TEQ to convert a channel impulse response (CIR) represented by the channel response information into a target impulse response (TIR).

6. The method of claim 5, wherein the step of jointly performing time domain channel shortening control and frequency domain flatness control over the TEQ to perform channel shortening equalization with frequency notch mitigation by utilizing the TEQ further comprises:

with aid of the product, solving the equation corresponding to the relaxed channel convolution matrix, in order to obtain the equalization information.

7. The method of claim 5, wherein the step of jointly performing time domain channel shortening control and frequency domain flatness control over the TEQ to perform channel shortening equalization with frequency notch mitigation by utilizing the TEQ further comprises:
    solving the equation corresponding to the relaxed channel convolution matrix to obtain a least-squares solution corresponding to the equation, and utilizing the least-squares solution as the equalization information.

8. The method of claim 7, wherein the step of jointly performing time domain channel shortening control and frequency domain flatness control over the TEQ to perform channel shortening equalization with frequency notch mitigation by utilizing the TEQ further comprises:
    minimizing a value of a cost function associated to the equation corresponding to the relaxed channel convolution matrix to obtain the least-squares solution.

9. The method of claim 8, wherein the cost function comprises at least one term associated to the equation corresponding to the relaxed channel convolution matrix; and the cost function is a two-norm of the at least one term.

10. The method of claim 5, wherein the step of jointly performing time domain channel shortening control and frequency domain flatness control over the TEQ to perform channel shortening equalization with frequency notch mitigation by utilizing the TEQ further comprises:
    solving an equation corresponding to the relaxed channel convolution matrix, in order to obtain a plurality of elements of an equalization vector, wherein the equalization vector is utilized as the equalization information; and
    utilizing the plurality of elements of the equalization vector as a plurality of TEQ tap coefficients of the TEQ to control the TEQ.

11. The method of claim 1, further comprising:
    performing frequency domain flatness control over the TEQ by adaptively adjusting a size/location of the portion of matrix elements of the channel convolution matrix to be omitted, in order to control degree of frequency notch mitigation by utilizing the TEQ.

12. A method for performing channel shortening equalization with frequency notch mitigation, the method being applied to an electronic device, the electronic device comprising a time domain equalizer (TEQ), the method comprising the steps of:
    obtaining, by a controller, channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and
    based upon the relaxed channel convolution matrix, jointly performing time domain channel shortening control and frequency domain flatness control over the TEQ to perform channel shortening equalization with frequency notch mitigation by utilizing the TEQ, wherein the step of jointly performing time domain channel shortening control and frequency domain flatness control over the TEQ to perform channel shortening equalization with frequency notch mitigation by utilizing the TEQ further comprises:
    calculating, by a matrix multiplier comprised in a calculation circuit, a product of a complex conjugate transpose of the relaxed channel convolution matrix and the relaxed channel convolution matrix;
    wherein the portion of matrix elements of the channel convolution matrix comprises at least one row of matrix elements within the channel convolution matrix;
    at least one relative row location of the at least one row of matrix elements within the channel convolution matrix corresponds to a delay parameter that is utilized for controlling a window position of channel shortening;
    the portion of matrix elements of the channel convolution matrix comprises a plurality of rows of matrix elements within the channel convolution matrix; and the plurality of rows of matrix elements ends at a $(d+v+1)^{th}$ row within the channel convolution matrix, wherein the parameter d represents a delay parameter that is utilized for controlling the window position of channel shortening, and the parameter v represents a length of a cyclic prefix (CP).

13. The method of claim 12, wherein a number of the plurality of rows of matrix elements is equal to v.

14. The method of claim 12, wherein the step of jointly performing time domain channel shortening control and frequency domain flatness control over the TEQ to perform channel shortening equalization with frequency notch mitigation by utilizing the TEQ further comprises:
    performing a delay search operation to determine the delay parameter, in order to control performance of channel shortening.

15. The method of claim 12, wherein the step of jointly performing time domain channel shortening control and frequency domain flatness control over the TEQ to perform channel shortening equalization with frequency notch mitigation by utilizing the TEQ further comprises:
    solving an equation corresponding to the relaxed channel convolution matrix, in order to obtain equalization information, wherein the equalization information is utilized for controlling the TEQ to convert a channel impulse response (CIR) represented by the channel response information into a target impulse response (TIR).

16. The method of claim 15, wherein the step of jointly performing time domain channel shortening control and frequency domain flatness control over the TEQ to perform channel shortening equalization with frequency notch mitigation by utilizing the TEQ further comprises:
    with aid of the product, solving the equation corresponding to the relaxed channel convolution matrix, in order to obtain the equalization information.

17. The method of claim 15, wherein the step of jointly performing time domain channel shortening control and frequency domain flatness control over the TEQ to perform channel shortening equalization with frequency notch mitigation by utilizing the TEQ further comprises:
    solving the equation corresponding to the relaxed channel convolution matrix to obtain a least-squares solution corresponding to the equation, and utilizing the least-squares solution as the equalization information.

18. The method of claim 17, wherein the step of jointly performing time domain channel shortening control and frequency domain flatness control over the TEQ to perform channel shortening equalization with frequency notch mitigation by utilizing the TEQ further comprises:
    minimizing a value of a cost function associated to the equation corresponding to the relaxed channel convolution matrix to obtain the least-squares solution.

19. The method of claim 18, wherein the cost function comprises at least one term associated to the equation corresponding to the relaxed channel convolution matrix; and the cost function is a two-norm of the at least one term.

20. The method of claim 15, wherein the step of jointly performing time domain channel shortening control and frequency domain flatness control over the TEQ to perform channel shortening equalization with frequency notch mitigation by utilizing the TEQ further comprises:

solving an equation corresponding to the relaxed channel convolution matrix, in order to obtain a plurality of elements of an equalization vector, wherein the equalization vector is utilized as the equalization information; and utilizing the plurality of elements of the equalization vector as a plurality of TEQ tap coefficients of the TEQ to control the TEQ.

21. The method of claim 12, further comprising:

performing frequency domain flatness control over the TEQ by adaptively adjusting a size/location of the portion of matrix elements of the channel convolution matrix to be omitted, in order to control degree of frequency notch mitigation by utilizing the TEQ.

22. An apparatus for performing channel shortening equalization with frequency notch mitigation, the apparatus comprising at least one portion of an electronic device, the electronic device comprising a time domain equalizer (TEQ), the apparatus comprising:

a controller arranged to obtain channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and a calculation circuit arranged to perform calculations according to the relaxed channel convolution matrix, wherein based upon the relaxed channel convolution matrix, the calculation circuit jointly performs time domain channel shortening control and frequency domain flatness control over the TEQ to perform channel shortening equalization with frequency notch mitigation by utilizing the TEQ, wherein the calculation circuit further comprises:

a matrix multiplier arranged to calculate a product of a complex conjugate transpose of the relaxed channel convolution matrix and the relaxed channel convolution matrix;

wherein the portion of matrix elements of the channel convolution matrix comprises at least one row of matrix elements within the channel convolution matrix;

at least one relative row location of the at least one row of matrix elements within the channel convolution matrix corresponds to a delay parameter that is utilized for controlling a window position of channel shortening;

the portion of matrix elements of the channel convolution matrix comprises a plurality of rows of matrix elements within the channel convolution matrix; and the plurality of rows of matrix elements starts at a $(d+2)^{th}$ row within the channel convolution matrix, wherein the parameter d represents the delay parameter that is utilized for controlling the window position of channel shortening.

23. The apparatus of claim 22, wherein the calculation circuit comprises:

a delay search module arranged to perform a delay search operation to determine the delay parameter, in order to control performance of channel shortening.

24. The apparatus of claim 22, wherein the calculation circuit comprises:

a linear equation solver arranged to solve an equation corresponding to the relaxed channel convolution matrix, in order to obtain equalization information, wherein the equalization information is utilized for controlling the TEQ to convert a channel impulse response (CIR) represented by the channel response information into a target impulse response (TIR).

25. The apparatus of claim 24, wherein with aid of the product, the linear equation solver solves the equation corresponding to the relaxed channel convolution matrix, in order to obtain the equalization information.

26. The apparatus of claim 22, wherein the apparatus comprises the TEQ.

27. An electronic system, comprising a sub-system, wherein the sub-system comprises the apparatus of claim 22.

28. An apparatus for performing channel shortening equalization with frequency notch mitigation, the apparatus comprising at least one portion of an electronic device, the electronic device comprising a time domain equalizer (TEQ), the apparatus comprising:

a controller arranged to obtain channel response information from channel estimation to determine a relaxed channel convolution matrix corresponding to the channel response information, with the relaxed channel convolution matrix being a partial matrix of a channel convolution matrix corresponding to the channel response information, wherein the relaxed channel convolution matrix is obtained from omitting a portion of matrix elements of the channel convolution matrix; and a calculation circuit arranged to perform calculations according to the relaxed channel convolution matrix, wherein based upon the relaxed channel convolution matrix, the calculation circuit jointly performs time domain channel shortening control and frequency domain flatness control over the TEQ to perform channel shortening equalization with frequency notch mitigation by utilizing the TEQ, wherein the calculation circuit further comprises:

a matrix multiplier arranged to calculate a product of a complex conjugate transpose of the relaxed channel convolution matrix and the relaxed channel convolution matrix;

wherein the portion of matrix elements of the channel convolution matrix comprises at least one row of matrix elements within the channel convolution matrix;

at least one relative row location of the at least one row of matrix elements within the channel convolution matrix corresponds to a delay parameter that is utilized for controlling a window position of channel shortening;

the portion of matrix elements of the channel convolution matrix comprises a plurality of rows of matrix elements within the channel convolution matrix; and the plurality of rows of matrix elements ends at a $(d+v+1)^{th}$ row within the channel convolution matrix, wherein the parameter d represents the delay parameter that is utilized for controlling the window position of channel shortening, and the parameter v represents a length of a cyclic prefix (CP).

29. The apparatus of claim 28, wherein the calculation circuit comprises:
- a delay search module arranged to perform a delay search operation to determine the delay parameter, in order to control performance of channel shortening.

30. The apparatus of claim 28, wherein the calculation circuit comprises:
- a linear equation solver arranged to solve an equation corresponding to the relaxed channel convolution matrix, in order to obtain equalization information, wherein the equalization information is utilized for controlling the TEQ to convert a channel impulse response (CIR) represented by the channel response information into a target impulse response (TIR).

31. The apparatus of claim 30, wherein with aid of the product, the linear equation solver solves the equation corresponding to the relaxed channel convolution matrix, in order to obtain the equalization information.

32. The apparatus of claim 28, wherein the apparatus comprises the TEQ.

33. An electronic system, comprising a sub-system, wherein the sub-system comprises the apparatus of claim 28.

* * * * *